US009126625B2

(12) United States Patent
Battlogg et al.

(10) Patent No.: US 9,126,625 B2
(45) Date of Patent: Sep. 8, 2015

(54) CLOSED-LOOP CONTROL METHOD FOR AN ENERGY ABSORBER

(75) Inventors: Stefan Battlogg, St. Anton I.M. (AT); Jürgen Pösel, Bludenz (AT); Gernot Elsensohn, St. Anton I.M. (AT)

(73) Assignee: Inventus Engineering GmbH, St. Anton/Montafon (AT)

( * ) Notice: Subject to any disclaimer, the term of this patent is extended or adjusted under 35 U.S.C. 154(b) by 0 days.

(21) Appl. No.: 13/697,484

(22) PCT Filed: May 10, 2011

(86) PCT No.: PCT/EP2011/002327
§ 371 (c)(1),
(2), (4) Date: Nov. 12, 2012

(87) PCT Pub. No.: WO2011/141164
PCT Pub. Date: Nov. 17, 2011

(65) Prior Publication Data
US 2013/0060428 A1 Mar. 7, 2013

(30) Foreign Application Priority Data

May 10, 2010 (DE) .......................... 10 2010 020 086

(51) Int. Cl.
| | |
|---|---|
| *F16F 9/53* | (2006.01) |
| *F16F 13/30* | (2006.01) |
| *B62D 1/19* | (2006.01) |
| *B60N 2/02* | (2006.01) |
| *B60N 2/24* | (2006.01) |

(Continued)

(52) U.S. Cl.
CPC .............. *B62D 1/192* (2013.01); *B60N 2/0276* (2013.01); *B60N 2/24* (2013.01); *B60N 2/4242* (2013.01); *B60N 2/42736* (2013.01); *F16F 9/535* (2013.01); *F16F 13/305* (2013.01)

(58) Field of Classification Search
CPC ................................ F16F 13/305; B60N 2/503
See application file for complete search history.

(56) References Cited

U.S. PATENT DOCUMENTS

| | | | |
|---|---|---|---|
| 6,116,648 | A | 9/2000 | Holly et al. |
| 6,152,488 | A | 11/2000 | Hedderly et al. |
| 6,279,952 | B1 * | 8/2001 | Van Wynsberghe et al. . 280/777 |

(Continued)

FOREIGN PATENT DOCUMENTS

| | | |
|---|---|---|
| DE | 600 09 208 T2 | 8/2004 |
| EP | 0 979 768 A2 | 2/2000 |

(Continued)

*Primary Examiner* — John R Olszewski
*Assistant Examiner* — Todd Melton
(74) *Attorney, Agent, or Firm* — Laurence A. Greenberg; Werner H. Stemer; Ralph E. Locher

(57) ABSTRACT

Closed-loop control of an energy absorber acting as a damper between two parts that are movable relative to one another. A damping force of the energy absorber, or damper, can be adjusted by way of the change in the viscosity of a magnetorheological fluid (MRF), which change can be influenced by a magnetic field of a coil. According to the method it is possible to decelerate an impact or a movement with the lowest possible forces in order to minimize possible consequential damage/loading by way of setting as constant a deceleration as possible, as small a deceleration as possible, by way of using the entire available deceleration travel, and low or zero residual speed at the end of the deceleration travel independently of the moving mass or speed.

25 Claims, 6 Drawing Sheets

Figure 1:
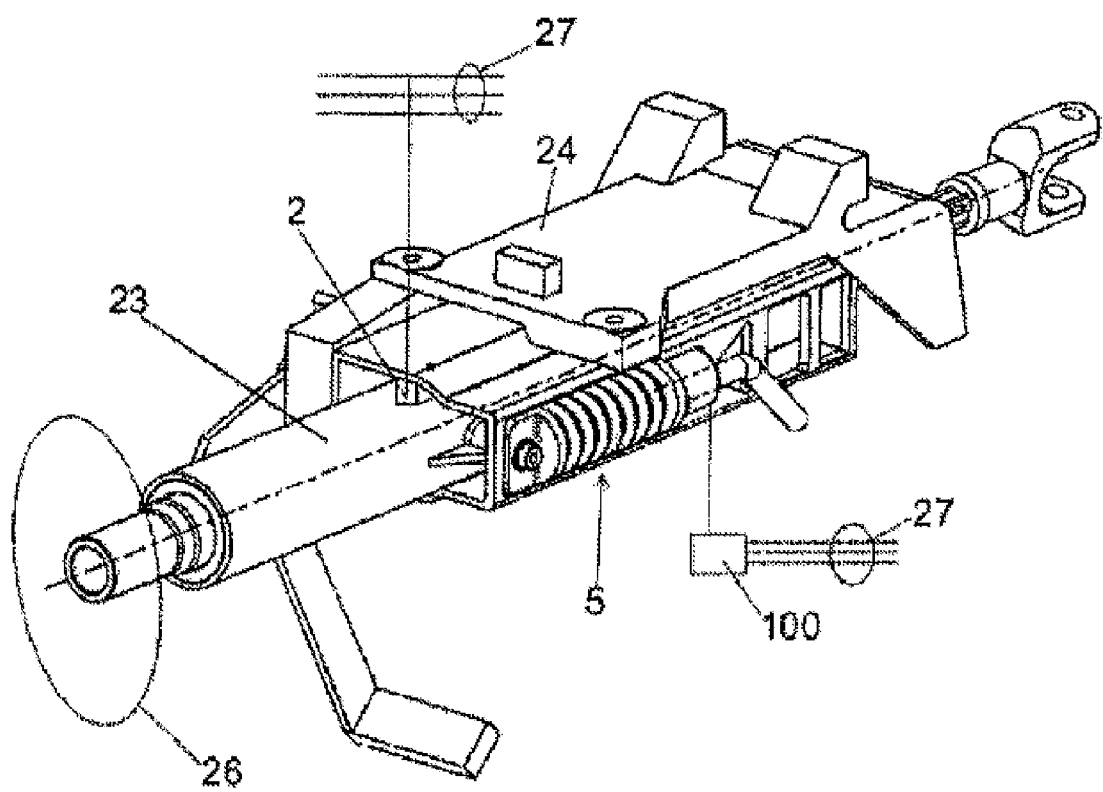

(51) Int. Cl.
*B60N 2/42* (2006.01)
*B60N 2/427* (2006.01)

(56) References Cited

U.S. PATENT DOCUMENTS 7,921,973 B2 * 4/2011 Wereley et al. ............... 188/266
8,292,048 B2 10/2012 Battlogg et al.

2004/0046377 A1 3/2004 Meduvsky et al.
2006/0118370 A1 6/2006 Izawa et al.
2008/0163716 A1 7/2008 Battlogg et al.

FOREIGN PATENT DOCUMENTS

| EP | 1 060 974 A1 | 12/2000 |
| WO | 2007/002970 A1 | 1/2007 |
| WO | 2007/068436 A1 | 6/2007 |

* cited by examiner

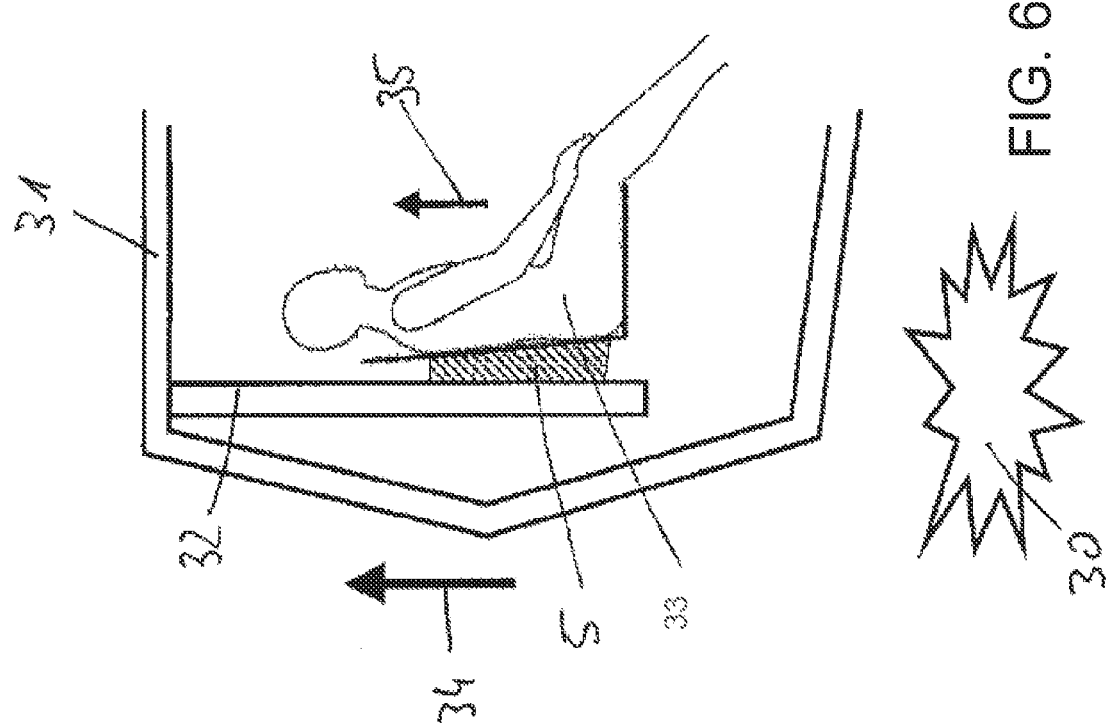

CLOSED-LOOP CONTROL METHOD FOR AN ENERGY ABSORBER

BACKGROUND OF THE INVENTION

Field of the Invention

The present invention relates to a method for the closed-loop control of an energy absorber by closed-loop control of the current flow of an electromagnetic coil, which controls the flowability of a magnetorheological fluid of an energy absorber, wherein the energy absorber acts as a damper between two parts, which are movable relative to one another along a limited travel distance, and whose damping force is determined by the current flow through the electromagnetic coil.

Furthermore, the invention relates to a device for the closed-loop control of an enerqy absorber having a piston-cylinder unit, by which a magnetorheological fluid is pressed by a piston-cylinder unit through a constriction, wherein the flowability of the magnetorheological fluid at the constriction is changeable by the current flow through a coil, whereby the damping force is settable.

The general technical field which the present invention relates to is the deceleration of moving masses within a defined travel distance, wherein the forces acting on the masses are to be as small as possible. Neither the mass nor the impact velocity of the deceleration device—the energy absorber—are known. This will be explained hereafter based on the example of the driver of a motor vehicle in the event of an accident. The term "deceleration" means a velocity change with decreasing absolute value of the velocity. The term "acceleration" describes a velocity change with decreasing or increasing absolute value of the velocity. The term "deceleration" is applicable for the described case of an impact of a vehicle on a slow or stationary obstruction. Since the present context primarily relates to a minimization of the forces acting on persons or objects, in general the term "acceleration" is preferable.

In the event of an impact in the travel direction, a vehicle is subjected to high deceleration forces. For example, in the event of a frontal impact on a fixed obstruction, a deceleration from 50 km/h to a standstill can occur in a distance of 1 m, which corresponds to the available deformation distance of the motor vehicle. In the same way, the driver of the motor vehicle is also decelerated from the starting velocity to a velocity of 0. The currently used safety systems in motor vehicles, such as safety belts, airbags, and movable steering column, are to ensure that the deceleration of the driver occurs as uniformly as possible and acceleration peak values are avoided.

It is generally presumed that in the event of decelerations of greater than 50 g, the effects on a human body are so large that a corresponding impact results in fatal injuries. This applies in particular to the head and upper body region. Therefore, numerous technical solutions have been proposed and also used to minimize these acceleration loads during an accident. However, current technical systems are at best switchable in multiple stages, for example to be able to differentiate between "belted" and "not belted" and are designed for a "normal crash". That is to say, the forces of the deceleration devices are typically designed so that a man approximately corresponding to the population average experiences the smallest possible loads in the event of a precisely defined accident situation (type of accident, impact velocity, covering . . . ).

It is problematic that, for example, a substantially lighter woman in the same accident situation will be subjected to significantly higher loads than the above-described man, since she will be more strongly decelerated at uniform braking force F, i.e., experiences a higher acceleration a ($F=m*a$). However, if a substantially heavier person participates in the same accident, the braking force is possibly insufficient to completely decelerate the person and the movement energy remaining at the end of the travel distance will be converted into a short, but all the higher force pulse at the stop, which significantly increases the risk of injury.

To improve the activation capability of the energy absorption, technical solutions are proposed in WO 2007002970 and WO 2007068436, in which during the telescoping of the steering column like a damper, a piston presses on a chamber having a magnetorheological fluid (MRF). The magnetorheological fluid is pressed through a corresponding electrically activatable valve, which, through its changeable magnetic field, changes the flowability of the magnetorheological fluid or the shear stress, respectively, and therefore the resistance force against the movement of the piston. This structural element offers the capability of varying the magnetization of the magnetorheological fluid by activating an electromagnetic coil at the moment of impact and therefore setting the damping behavior of the damping element. This procedure is reversible. The regulating speed and the setting speed of the damping properties are in the range of significantly less than 10 ms here, which is sufficiently rapid to be able to intervene by regulation multiple times during the duration of an impact, which lasts 30 to 100 ms on average. A suitable closed-loop control method is not proposed in these publications, however.

Such a method for a hydraulic damper is proposed in DE 60009208 T2. This is also based primarily on a steering column, which is movable along a deformation distance in the axial direction and is additionally pivotable. Inter alia, a magnetorheological damper controllable by magnetic field is proposed, which can be regulated via an electrically generated magnetic field with respect to its damping properties during an impact. However, the method provides that the acceleration acting on the vehicle occupants is regulated by the damping of the steering column in such a manner that specific predefined acceleration values are not exceeded. Thus, for example, the acceleration can be measured via acceleration sensors, which are assigned to the steering wheel, and limited, for example, to 25 g, which is sufficient in many cases to avoid fatal injuries.

This method represents an improvement in relation to the prior art, but it nonetheless has weak points in spite of partially complex sensors. Thus, for example, the absolute deceleration (=relative to the reference system "Earth") of the driver can be established by an acceleration pickup on the steering wheel and parameters such as impact velocity and vector are possibly known, but the reference system "vehicle body", which is decisive for the occupants, is not detected. In particular for the driver, the relative movement to the vehicle body is decisive, for example if the driver is decelerated by the steering column to the absolute velocity 0, but the vehicle body is still in movement.

BRIEF SUMMARY OF THE INVENTION

It is thus the object of the present invention to provide a closed-loop control method for a hydraulic energy absorber based on a magnetorheological fluid, using which the load on the unit to be decelerated is minimized. The method according to the invention is distinguished in that within the system limits:

the entire available travel distance is always used for the deceleration, at the end of the travel distance, the relative velocity is approximately 0 or does not exceed a specific limiting value, the deceleration runs as constantly as possible (no force pulses), the deceleration assumes the lowest possible value, and the regulation functions independently of the mass and the initial velocity of the unit to be decelerated.

This object is achieved by a method as claimed. Advantages of the method according to the invention are represented in the exemplary embodiments and the dependent claims.

The method presumes an energy absorber, whose first movable end is connected directly or via mechanical aids to the unit to be decelerated or on which the unit impacts, respectively, and whose second end is fixedly connected to the reference system, in relation to which the unit is decelerated. The relative velocity, at which both ends of the energy absorber move toward one another, is detected continuously or at intervals and the acceleration (in most cases, this means a deceleration) required for a standstill at the end of the travel distance is calculated. A regulator generates the activation current for the at least one coil of the energy absorber from this calculated required acceleration, so that via the magnetic field of the coil, the flowability of the magnetorheological fluid is changed in such a manner that the calculated required acceleration is at least approximately achieved. Thus, independently of the mass of the unit to be decelerated or other parameters, the relative velocity is decreased to approximately 0 or below a specific limiting value by the end of the compression distance, whereby hard jolts and acceleration peaks thus resulting are avoided.

The term "limited travel distance" is not restricted in the present description and the patent claims to linear movements, but rather also comprises limited rotational movements and pivot movements and other nonlinear travel distances.

The regulator knows the instantaneous relative velocity and the remaining residual distance, the optimum deceleration may be calculated easily therefrom, at which the moving unit would be stationary at the end of the travel distance. This calculation can be performed continuously or at specific intervals. The regulator calculates the counterforce which can be set via the coil current from this deceleration value.

It is also possible that the regulator initially calculates, from the starting velocity and the deceleration pathway, the velocity profile, according to which the velocity must run as a function of time or pathway, to reach 0 at the pathway end. In the course of the movement, the regulator adapts the counterforce of the energy absorber in such a manner that target velocity and actual velocity correspond.

It is conceivable that the velocity profile in the movement curve is updated, i.e., recalculated, as a function of time, distance, or other parameters.

Since the deceleration is also dependent on the mass of the moving unit, the regulator must compensate for this influence. If the mass is already known, the regulator can be optimally designed. However, even without knowing the mass, the regulator can deliver good results over a large range, which is an advantage of this method. Depending on the application and the required mass range, it can be advantageous to conclude the moving mass during the deceleration from the ratio of the generated counterforce and the achieved deceleration, and to adapt the regulating parameters.

The method according to the invention allows a mass to be stopped from the relative movement using the least possible acceleration, i.e., the smallest counterforce, under the given circumstances (braking distance, mass, velocity). The existing kinetic energy is converted as consistently as possible over the entire possible travel distance.

It is possible that other closed-loop control methods according to the prior art, for example, by limiting the maximum permissible acceleration during the movement, exert a smaller load on the unit to be decelerated, however, in this case, not all of the kinetic energy is converted and a residual velocity remains. This is typically converted at the stop in a short time or distance at a high force level, with possible resulting damage depending on the type of the unit to be decelerated.

One application can be mine protection of vehicles, for example, where the method according the invention, using energy absorbers between seat frames and vehicle body, decreases the risk of injury or the severity of the injuries for drivers and passengers in the event of an explosion under the vehicle floor. In the same vehicle, the method can also be applied to protect important components such as electronic systems from damage and keep them ready for use even in case of attack.

Depending on the application, the energy absorber can be conceived for a single use or, for example, for multiple applications as a self-resetting damper. In the case of mine protection, firstly the acceleration due to the explosion (e.g., being thrown up vertically) and subsequently the impact of the vehicle on the road (e.g., free fall) can thus be damped.

The application of the method is also possible, for example, on a lock gate, in order to protect it via a ram safeguard having energy absorbers from damage by boats running into it. Velocity and moving mass are again unknown and differ significantly from the previous exemplary applications. However, in this case the acting forces can also be minimized by the method according to the invention and therefore the resulting damage may be kept as small as possible. The energy absorber is constructed for this purpose so that it can be used again multiple times.

In relation to existing methods and structures for energy absorption, the method according to the invention operates over a wide dynamic range (initial velocity, mass, braking distance), without knowing the starting variables mass and initial velocity. The method can be implemented with comparatively low expenditure.

A regulator according to the present invention only requires the relative movement between moving and resting parts of the energy absorber as the input variable. Various methods for the direct or indirect determination of position, distance, velocity, or acceleration can be applied, as long as the required variables can be calculated therefrom. The method is described hereafter on the basis of a position sensor, however, other sensors can expressly also be used.

The sensor is preferably a digital position sensor, so that any distance change can be detected directly and without computing effort. Thus, for example, in relation to a potentiometric position sensor, an A/D converter for signal conversion can be omitted.

In another embodiment, it can be provided that acceleration sensors are fastened both in the movable part and also in the stationary part of the system, wherein the distance and the relative velocity can be calculated from the difference of the detected accelerations during the impact. This method is more complex, but can offer lower-noise velocity and distance values through the integration of the acceleration (the noise is amplified by deriving a distance signal). It is also possible to use multiple different sensors.

A position sensor is preferably used, which converts the linear movement into a rotational movement and which is designed, for example, as an optical encoder or as a magnetic rotary encoder. Magnetic rotary encoders have been proven for some time in motor vehicles in particular, for example in antilock brake systems for detecting the wheel speed. The conversion of the linear movement into a rotation can be performed by the sensor itself or by suitable mechanical aids, respectively. Various measuring principles and sensor technologies can also be used here.

The method according to the invention is not restricted to linear movements. Rotationally acting sensors can preferably be used in accordance with the application, for example during the deceleration of a rotational movement. Such a rotational movement can occur, for example, in a belt retractor in the case of safety belts in vehicles.

The use of magnetoinductive sensors, eddy current sensors, lasers, or radio detection and ranging (radar) for distance measurement is also conceivable. Various methods for direct and indirect determination of distance, position, velocity, or acceleration can be used, any combination of identical or different measuring methods is also possible. For example, the differential acceleration can be determined via two acceleration pickups fastened on different components.

For the regulation, it is possible to read out the sensor not using a fixed sampling frequency, but rather to adapt the sampling and/or closed-loop control frequency to the actual travel velocity. This can be expanded until the regulator no longer operates time-synchronously but rather distance-controlled. For this purpose, each distance step or a multiple of each distance step of the (digital) position sensor triggers a closed-loop control cycle, the time between the distance steps allows the calculation of velocity and acceleration. The essential advantage of this method is that the resolution of the position sensor can be relatively coarse, which makes the mass implementation easier because of lower production costs. The time resolution of the internal-processor time may be varied very easily and enlarged comparatively conveniently if needed, e.g., by a higher clock frequency of the processor.

The resolution of the sensor does not have to be constant over the entire travel distance, it can be changed discretely or continuously. A high travel velocity at the beginning and a high resolution (at slower travel velocity) toward the end of the travel distance can thus be implemented easily.

The entire method according to the invention can thus be implemented using only one sensor, wherein the corresponding sensor can be implemented comparatively simply, robustly, and cost-effectively. Further sensors or interfaces to existing control units are not required.

Depending on the application, the incorporation in existing safety systems can be advantageous. This can be the communication with existing control units and sensors, on the one hand, and the method according to the invention can be implemented with comparatively little effort in existing control units, on the other hand. For example, the method for the closed-loop control of an energy absorber in the steering column of a motor vehicle can be implemented in an existing airbag control unit. This control unit typically does not have a further task after triggering the airbag and can thus expediently still provide its sensors and computing power.

An electronic system is required to regulate the energy absorption. This system comprises, on the one hand, a microcontroller, which is suitably programmed to calculate the regulating variable from the sensor signals, and, on the other hand, power electronics, which regulate the coil current so that the calculated deceleration values are at least approximately achieved. The method according to the invention can be implemented in various hardware such as a microcontroller, CPLD, FPGA, ASIC, etc., or can be embodied as hardware, for example discretely constructed.

In the energy absorber, it can be provided that a magnetic field, which corresponds to a moderate damping force, is applied by a permanent magnet to the magnetorheological fluid. The power electronics must then optionally build up an amplifying or an attenuating magnetic field via the coil, in order to adapt the damping to the requirements. The entire magnetic field does not have to be electrically generated. A moderate damping force is still provided by the permanent magnetic field in case of error, whereby a defined limp-home function is settable, whose force curve substantially corresponds to a typical system according to the prior art.

In typical applications, it can be provided that the electronics are in an idle state during normal operation and only activated at all in case of use, for example if a trigger announces the imminent impact. The electronics can also take over additional tasks in normal operation, for example, self-checking, communication with sensors and the like, and also, after the use, recording the deceleration values or triggering an alarm if limiting values are exceeded, for example.

A special advantage of the method according to the invention is that possible interfering variables such as force variations due to uneven friction resistance in guides, temperature-related flowability variations, manufacturing-related component tolerances and the like are automatically taken into consideration and are compensated for within the system limits by an adapted force of the energy absorber. Changes of the parameters during the deceleration procedure are also taken into consideration, if the end of the travel distance is not yet reached.

In order, for example, to set the force which an energy absorber exerts on the body to be decelerated to a defined value, typical systems must either measure this force directly, which is very complex and not always feasible, or the system properties know how to conclude the force via other parameters, e.g., the coil current. Interfering variables which have an influence on the system properties are also to be determined and compensated for.

The temperature of the magnetorheological fluid is typically important, since, depending on the possible operating temperature range, it has a very large influence on the flowability and therefore on the force of the energy absorber. Depending on the application, the temperature elevation due to the energy conversion during the deceleration can also have an influence on the force range.

In the method according to the invention, the temperature is automatically compensated for in addition to all other interfering variables. The temperature only has influence on the working range (force range) of the system and is to be taken into consideration in the system design, it no longer has to be taken into consideration later. Therefore, the temperature sensor can be entirely omitted in the mass application.

Instead of an energy absorber having magnetorheological fluid, an energy absorber having electrorheological fluid (ERL) can also be used in the method according to the invention. In this case, instead of the magnetic field (coil current), the electrical field (potential difference or electrical voltage between poles, respectively) is varied.

BRIEF DESCRIPTION OF THE SEVERAL
VIEWS OF THE DRAWING

Figure 2:
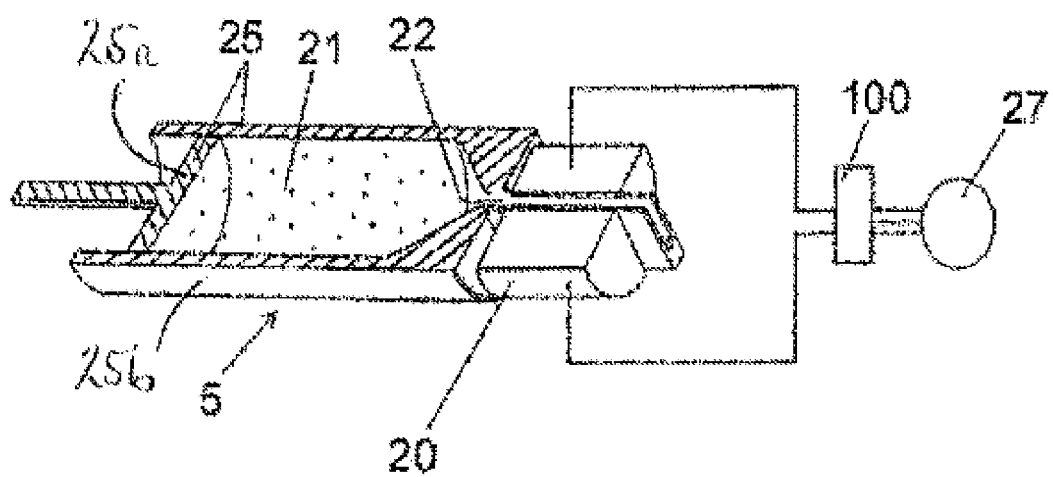
Figure 3:
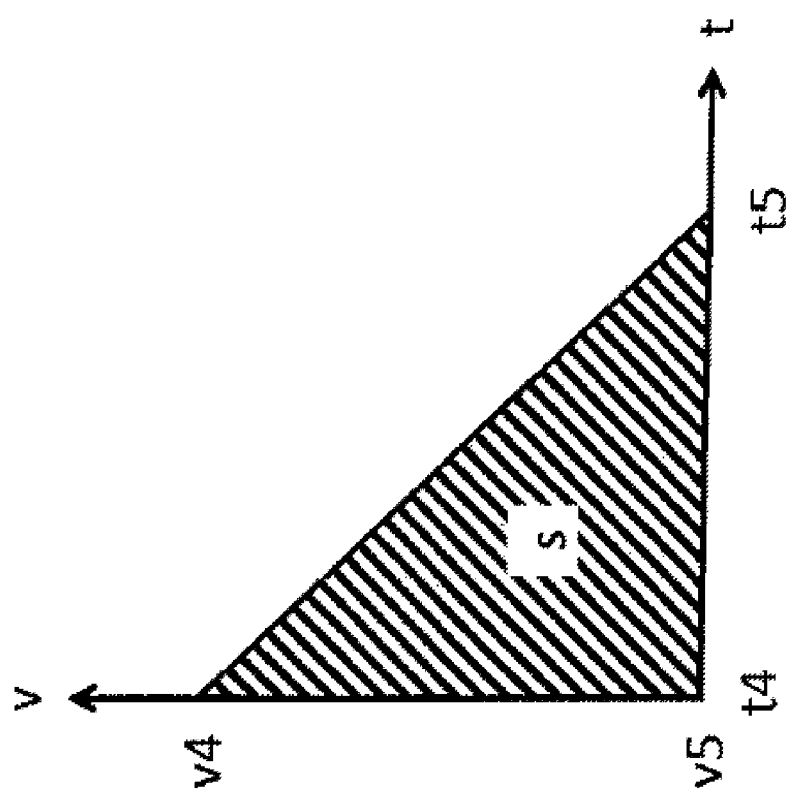
Figure 4:
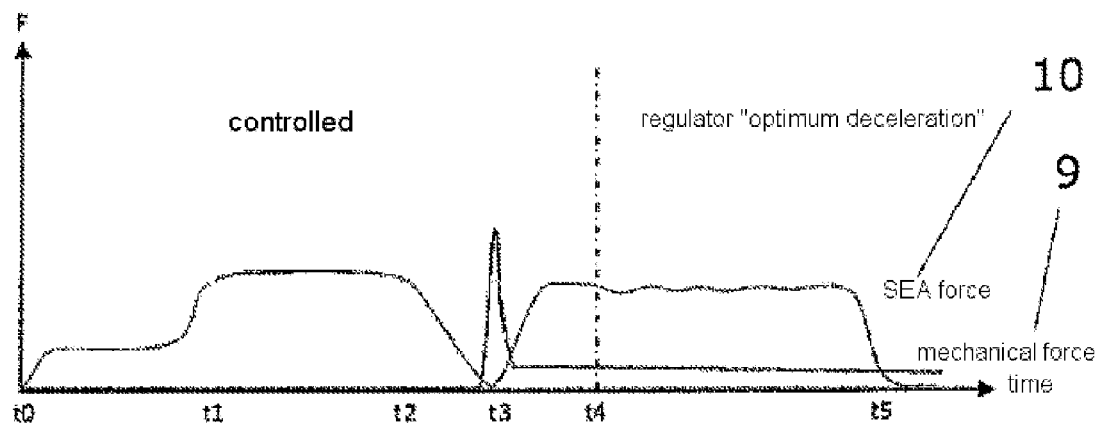
Figure 5:
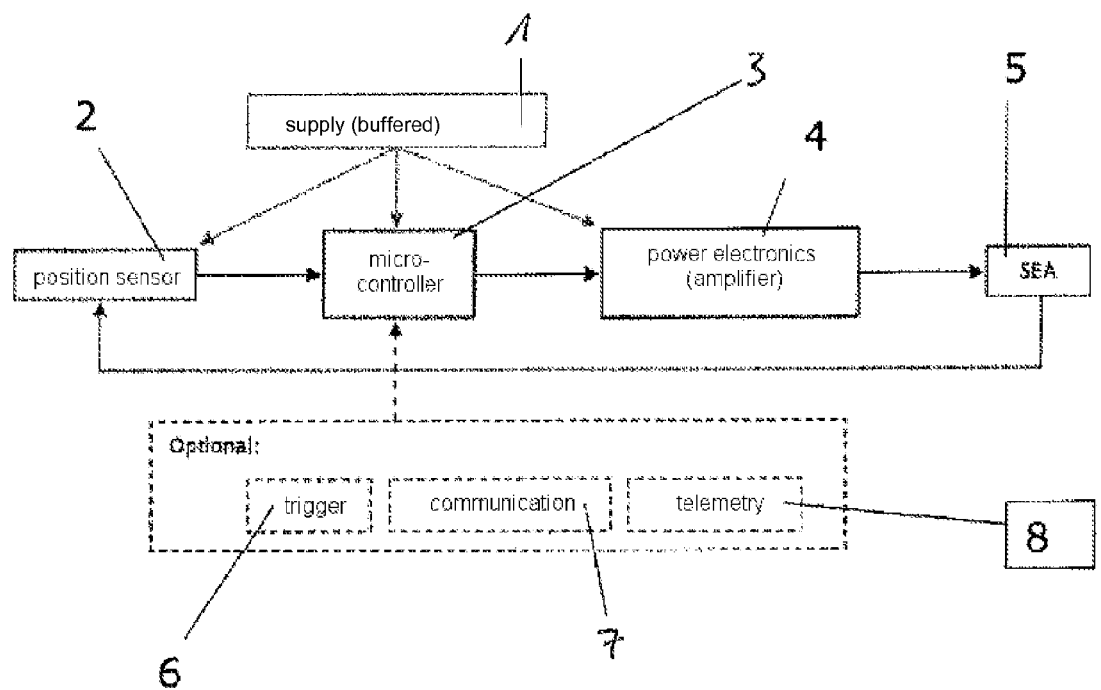

The present invention is described in greater detail hereafter on the basis of the drawings. In the figures:

FIG. 1: shows an exemplary application in a steering column;

FIG. 2: shows a detail from an energy absorber corresponding to FIG. 1;

FIG. 3: shows the optimum time curve of the relative velocity;

FIG. 4: shows the temporal force curve of an energy absorber based on the example of an accident with frontal impact on an obstruction;

FIG. 5: shows a block diagram of the regulation used; and

FIG. 6: shows a schematic exemplary application as an energy absorber in a seat during a mine explosion.

DESCRIPTION OF THE INVENTION

FIG. 1 shows as an exemplary application a steering column having integrated energy absorber, in which the displaceable steering column part 23 is held using a body-fixed steering column part 24 on the vehicle body (not shown). In case of an impact (crash), the displaceable steering column part 23 is displaced in relation to the body-fixed steering column part 24 in its longitudinal direction by the impact of the driver on the schematically shown steering wheel 26. The energy absorber 5 is fastened at one end on the displaceable steering column part 23 and at its other end on the body-fixed steering column part 24.

A position sensor 2 measures the travel distance of the displaceable steering column part 23 in relation to the body-fixed steering column part 24. The distance information is transmitted to the controller 100 via a safety bus 27. The controller 100 determines, on the basis of the distance information of the position sensor 2, the required current of the coil 20 to set the desired deceleration of the energy absorber 5.

The regulator can be adapted better to the distance by additional sensors. For example, the temperature of the magnetorheological fluid can be determined via the coil resistance and a corresponding regulation adaptation can be carried out.

A possible construction of the energy absorber 5 is shown in FIG. 2. The energy absorber 5 has a piston-cylinder unit 25, which is filled with a magnetorheological fluid 21. During a relative movement of the piston-cylinder unit 25 having a movable piston part 25a and a fixed cylinder part 25b, the piston is displaced in relation to the cylinder, so that the magnetorheological fluid is pressed through the constriction 22 into an outlet channel. The flowability of the magnetorheological fluid 21 can be changed by the magnetic field of the coil 20, whereby the force on the piston-cylinder unit 25 and therefore the deceleration of the moving masses may also be changed.

In the energy absorber for a steering column, the movable piston (25a) can be assigned to the displaceable steering column part (23) and the fixed cylinder (25b) can be assigned to the body-fixed steering column part (24). A transmission such as a lever or a cable pull with deflection roller can be used, whereby the relative velocity of the movable piston (25a) to the displaceable steering column part (23) does not have to correspond to the relative velocity of the fixed cylinder (25b) to the body-fixed steering column part (24).

A possible application of the method according to the invention, in which a transmission can be used, is the safety belt in vehicles. In the rotational construction as an energy absorber in the belt retractor, the ratio of the belt withdrawal velocity is not fixedly coupled to the speed of the retractor, but rather is dependent on the roll diameter (and therefore dependent on the covered distance or the position of the occupants, respectively). Upon installation in the belt anchor as a linear energy absorber, the released belt length can be approximately doubled and the force can be halved.

The coil current is determined by a controller 100, wherein the controller can communicate via the safety bus 27 with other systems. The power and/or signal transmission can also be performed wirelessly, for example via radio, to specific sensors or other occupant protection systems.

A preferred embodiment manages without a battery and receives the power required for the function by means of inductive coupling (wireless power supply). Embodiments are also particularly preferred which acquire the power required for operation directly from the environment and temporarily store it locally (energy harvesting). Thermoelectric generators, solar cells, elements which convert vibrational energy into electrical power, and others are conceivable for the power conversion, as well as corresponding local power accumulators. It is also conceivable to use the movement of the sensor itself for the power generation.

The power supply of the system was not shown, since preferably a power accumulator, for example a battery, an accumulator cell, or a capacitor, is integrated in the controller 100 or the energy absorber 5. A completely autonomous function of the system can thus be ensured, which makes replacement or refitting easier, for example, does not require later wiring in retrofit systems, or at least allows short-term operation if the onboard voltage of a vehicle fails in the event of an accident.

In FIG. 3, the time t, which is required at uniform deceleration for the travel distance, is plotted as a graph on the abscissa (x axis). The velocity v is plotted on the ordinate (y axis). The goal of the regulation is to reduce the starting velocity v4 at the point in time t4 along the straightest possible line up to the standstill (v5=0) at the point in time t5, which must be achieved at the end of the available travel distance s. The available travel distance s corresponds here to the surface enclosed in the graph. The slope of the line indicates the acceleration or deceleration, respectively, required for this purpose. A straight line means a constant deceleration over the travel distance, the direct connection between the starting velocity v4 and the point v5=0 defines the least possible deceleration, in the case of which the velocity v4 can be decelerated over the distance s to 0. The deceleration a is therefore only dependent on the starting velocity and the braking distance s.

However, the force F required for a specific deceleration a is dependent on the moving mass (F=m*a). If the regulator knows the moving mass, the regulation can be greatly simplified and the deceleration curve can be optimized. However, the regulator can also be constructed completely autonomously, i.e., only the distance is known to it at the beginning of the crash. The regulator must work out parameters lacking for the calculation from the distance signal and the internal-processor existing time. The following applies: the smaller the dynamic range (range of possible velocities and masses) of the regulator must be, the better the regulator can follow the optimum curve profile.

It is obvious that in the event of high impact velocities, for example the starting velocity V-max, an equally high deceleration is required over the entire distance to achieve the goal. If the deceleration is limited, as proposed in the prior art, the distance/velocity curve runs flatter and a residual velocity arises at the end of the available crash distance, which results in a hard impact. Depending on the application, however, a specific residual velocity can also be permissible in the method according to the invention, for example if it does not exceed harmful or hazardous values.

FIG. 4 shows an example of the time curve of the forces acting on the energy absorber 5 in a steering column from the beginning of an accident event. In this example, a control curve is superimposed on the regulator, which presumes the communication of the regulation with other control units and sensors.

The time t is plotted on the abscissa, the ordinate represents the force F. The mechanical force curve 9 illustrates the counterforces applied by the steering column against the displacement of the displaceable part of the steering column caused by the impact of the driver. The energy absorber force curve 10 illustrates the counterforce provided by the energizing of the coil of the energy absorber against a displacement of the displaceable part of the steering column.

At the point in time t0, which is possibly before the actual impact, the internal-vehicle safety systems establish that there is an accident. The first safety actuators are actuated, for example the belt tensioner, the seat adjustment, and the like. The energy absorber 5 already builds up a higher damping force to prevent a movement of the steering column 23 through inertia.

At the time t1, the airbag is fired. The counterforce of the energy absorber 5 is elevated once again beforehand, to prevent the movement of the steering column through the resulting momentum of the triggering of the airbag.

At the time t2, the controller 100 computes the imminent impact of the driver on the steering wheel 26, which was possibly announced by information from the safety belt system. The steering wheel 26 and the steering column 23 oppose the impact of the driver with a force 9 already through their mass inertia and friction forces, to which the force of the energy absorber 10 is added. In order to limit the total force which acts on the driver, the damping force of the energy absorber 10 is reduced at this moment. In relation to the prior art, the load of the driver can be significantly decreased, since a breakaway element can be omitted.

Immediately after the impact, the controller 100 increases the damping force of the energy absorber 5 to a starting value calculated from the existing accident parameters.

At the time t4, the range of the uniform deceleration of the driver is reached, the regulator takes over the calculation of the optimum deceleration based on the data of the position sensor 2 until the standstill. The counterforce of the energy absorber 5 is continuously monitored and adapted. The transition from the controller to the regulator can be flowing or can also occur abruptly depending on the time, the distance, the signal quality, and the result of the internal closed-loop control algorithms.

At the time t5, the standstill of the movable part of the steering column 23 in relation to the body-fixed part 24 is achieved, without a stop occurring because of a remaining residual velocity. In the optimum case, the relative velocity goes to 0 precisely upon reaching the end of the available distance.

However, FIG. 4 expressly only shows one possible example for superimposing the closed-loop control method according to the invention with a controller or another regulator. Depending on the application, greatly varying other methods can influence the actual closed-loop control method and run simultaneously or can be connected upstream or downstream therefrom.

The illustrated controller can preferably be modified in such a manner that the impact/the deceleration beginning is adapted to elastic and springy bodies. Through a modulation of the force of the energy absorber, the forces acting in the body to be decelerated can be monitored better and an excessively strong overshoot can be prevented, for example.

An advantageous embodiment provides additional sensors to optimize the regulation if, for example, the force generated by the energy absorber can deviate from the force relevant for the body to be decelerated. For example, in the case of an energy absorber for helicopter or mine protection seats, an additional acceleration pickup can be attached to the passenger or worn by the passenger (clothing, equipment, devices, etc.) or attached to components (belt, equipment, etc.) fastened to the passenger, respectively.

FIG. 5 shows a possible closed-loop control system of the present invention as a block diagram. Firstly, a voltage supply 1 is provided, which supplies a position sensor 2, a microcontroller 3, and power electronics 4 with electrical current. The power electronics 4 and the microcontroller 3 form the controller 100, which is shown in FIGS. 1 and 2. The power electronics 4 in turn activate a controllable energy absorber 5, which is implemented essentially as a hydrodynamic damper having a magnetorheological fluid, so that the damping force is controllable via an external magnetic field, wherein the magnetic field is variable via the current through a coil.

Possible additional components can comprise, inter alia, a trigger device 6, a communication unit 7, or a telemetry unit 8.

Depending on the type of the supply 1, a local power accumulator such as a capacitor or an accumulator cell can additionally be provided, which can cover possible short-term load peaks or can also provide the power for a deceleration procedure in the case of an interruption of the power supply, for example. A higher supply voltage allows more power to be stored and the inductive inertia of the coil to be overcome more rapidly. The charging and the status monitoring of the supply 1 of the power accumulator can be performed by the microcontroller 3.

In accordance with the application, the position sensor 2 must have a large dynamic range. In the case of slow travel velocity at the end of the travel distance, sufficient information is still to be generated to be able to resolve the distance at the corresponding sampling frequency with sufficient precision. At high travel velocities at the beginning of the travel distance, the processing of the distance information must still be possible. It is possible to convert the movement form, for example the linear movement, into a rotation, wherein the conversion can also comprise a transmission.

Digital or analog sensors can be better suitable depending on the application. For example, an analog/digital conversion can be saved by a digital sensor, which can save computing time and costs. For example, magnetic tape sensors or other inductive, resistive, or capacitive sensors can be used, however, optical encoders or magnetic rotary encoders are particularly advantageous.

A position sensor 2 is understood as a sensor which measures at least one physical variable, from which distance, velocity, and/or acceleration may be derived. Multiple sensors may also expressly be used.

The method typically places no special demands on the hardware, in the simplest case a microcontroller 3 having digital inputs and outputs and an internal timer is sufficient. Further encoder inputs, additional memory, and communication interfaces or functional units such as a PWM block can also be provided. Depending on the application, the implementation of the regulator in special hardware such as DSP, FPGA, ASIC, and others can be advantageous.

Instead of programming a regulator as code in a microcontroller, it is conceivable to construct the regulator from discrete components. Through suitable interconnection of amplifiers, resistors, capacitors, and the like, the method according to the invention may also be implemented.

The power electronics 4 implements the current specification of the controller 100 and monitors the current in the coil of the controllable energy absorber 5. A simple construction of the power electronics 4 having a switch activated via PWM is preferred, for example transistor, MOSFET or IGBT and a free-wheeling diode. Further expansion stages can be performed as a half bridge or full bridge. It is also possible to integrate further components in the power electronics, which can be used for status monitoring of the device, a further measured value acquisition for current, voltage, or temperature, or, for example, also heating the energy absorber 5.

The controllable energy absorber 5 can damp a movement having changeable force. It is to be coupled as rigidly as possible to the distance measurement. The position sensor 2 can preferably be integrated in the energy absorber 5.

A trigger 6 can also be provided, which announces an imminent impact and prepares the microcontroller 3 for it, for example. It can otherwise take over other activities such as self-monitoring, charging a power buffer, and similar activities or can remain in a power-saving idle state.

Using a communication module 7, the microcontroller 3 can communicate with other systems, to which it is connected via the safety bus 27, for example. The communication with the position sensor 2 can also occur via this interface, as schematically shown in FIG. 1. This offers advantages if multiple systems participate in the deceleration or have data, using which the regulator can be adapted better to the respective situation. In addition, error diagnosis and state monitoring are made easier.

Data of other systems or other sensors can be analyzed via a telemetry module 8. In this manner, for example, in a motor vehicle, important parameters, for example type of accident, severity of accident, driver weight, and driver position, and also data of other vehicles involved in the accident which are transmitted via WLAN, mobile wireless, or long-term evolution (LTE) can be communicated to the steering wheel even before the impact, to which the regulating parameters can be adapted.

FIG. 6 shows the application of the method on the example of a crew seat in a mine-resistant ambush protected (MRAP) vehicle. The figure schematically shows how a mine explosion 30 strongly accelerates the vehicle body 31 of the vehicle. The seat having the passenger 33 is movably connected via the energy absorber 5 to the seat carrier 32, which is in turn fixedly connected to the vehicle body 31.

Since the acceleration is strongest at the vehicle floor and decreases upward along the vehicle body 31, in this example the seat carrier 32 was attached to the vehicle roof. Of course, it is also possible to fasten the seat carrier 32 or the energy absorber 5 directly to other vehicle body parts.

The energy absorber 5 only relays a part of the vehicle body acceleration 34 to the passenger, because of which his resulting acceleration 35 is significantly less. The seat travels in the direction of the vehicle floor.

The method according to the invention also has the advantage here that although neither vehicle body acceleration 34, which is dependent on the type and location of the explosion 30, nor the weight of the passenger 33 are known, the energy absorber 5 is activated so that the load of the passenger 33 is as small as possible. This is achieved in that the acceleration 35 occurs as consistently as possible and using the smallest possible force, so that the relative velocity between vehicle body 31 and passenger 33 at the end of the travel distance is approximately 0 or is reduced to a tolerable amount, respectively.

In relation to typical methods according to the prior art, depending on the situation, neither is an unnecessarily high acceleration exerted, so that the travel distance is not completely used, nor is excessively weak acceleration used, whereby a hazardous force pulse can arise at the end of the travel distance.

After the seat having the passenger 33 has moved all the way down to the vehicle floor to compensate for the relative velocity, the energy absorber 5 or a system attached parallel thereto, for example a spring, can bring the seat back into its starting position or at least move it somewhat back. The energy absorber 5 can again be used as a force limiter, which limits the forces occurring.

The travel distance obtained by this reset can be used again to minimize the occurring forces by means of energy absorber 5 and the method according to the invention, when the vehicle, which was thrown upward by the explosion 30, strikes on the ground.

If a second explosion or even multiple explosions occur following the first explosion, this energy absorber can also be used again and once again minimizes the occurring forces.

Further fields of application for the energy absorber with regulation according to the features of claim 1 or the further claims can be, without being restricted thereto:

Damper in a safety belt device of (motor) vehicles (varying parameters as in the energy absorber in the above-described steering system, e.g., differing vehicle velocity, mass of the occupants, clothing of the occupants, feedback/adaptation to other safety systems, etc.).

Damper in the bumpers, seats, or the crash structure of (motor) vehicles (varying parameters as in the energy absorber in the above-described steering system, e.g., differing vehicle velocity, degree of coverage, etc.).

In machine tools or industrial devices as an end stop or emergency stop, so that moving tools, cranes, carriages, etc. can advantageously be brought to a standstill (without damage or with the least possible damage).

Catch device for landing aircraft on aircraft carriers. Adaptation of the catch cable force based on varying landing velocity and approach angle and on the aircraft weight (depending on aircraft type, load, and tank contents).

Damping systems in helicopters, preferably in the seats, which absorb the energy released upon impact on the ground because of, e.g., power plant damage (autorotation), so that the passengers are protected.

Damping the recoil in cannons/rifles (recoilless) depending on the ammunition.

Damping system in shoes, preferably in running shoes, so that upon striking the ground (running at varying velocity, varying step length, jumps over obstructions, muscle fatigue, pronation errors etc.), the energy is absorbed to protect the joints.

LIST OF REFERENCE NUMERALS

1 voltage supply
2 position sensor
3 microcontroller
4 power electronics
5 energy absorber
6 trigger device
7 communication unit
8 telemetry unit
9 mechanical force
10 energy absorber force
20 coil
21 magnetorheological fluid
22 constriction
23 displaceable steering column part 24 body-fixed steering column part
25a piston
25b cylinder
26 steering wheel
27 safety bus
30 explosion
31 vehicle body
32 seat carrier
33 passenger
34 vehicle body acceleration
35 passenger acceleration
100 controller

The invention claimed is:

1. A method for closed-loop control of a current flow in an electromagnetic coil disposed to control a flowability of a magneto-rheological fluid of an energy absorber, the energy absorber acting as a damper between two parts that are movable relative to one another along a limited travel distance, and having a damping force determined by the current flow in the electromagnetic coil, the method which comprises:
    repeatedly ascertaining a relative velocity between a first part of the energy absorber and a second part during a plurality of measurements conducted continuously or at intervals during a relative movement of the first and second parts;
    repeatedly ascertaining a still available travel distance between the first and second parts during each measurement;
    repeatedly calculating an acceleration required for the braking from the measured relative velocity to standstill up to an end of the travel distance during each measurement; and
    calculating the current flow from the acceleration required for braking such that, during further travel of the two relatively movable parts, a value of the acceleration required for braking is at least substantially achieved.

2. The method according to claim 1, which comprises calculating at least one or both of the relative velocity or the still available travel distance from signals of a position sensor disposed to detect a relative position of the first and second, relatively movable parts of the energy absorber.

3. The method according to claim 1, which comprises ascertaining at least one or both of the relative velocity or the still available travel distance from signals of at least two acceleration sensors, wherein at least one acceleration sensor is attached to a displaceable part of the energy absorber and at least one further acceleration sensor is attached to a part of the energy absorber resting in relation thereto or to connected elements corresponding to the first and second parts.

4. The method according to claim 1, which comprises determining at least one variable selected from the group consisting of a position, a distance, a velocity, and an acceleration required for the closed-loop control directly or indirectly via other physical variables from at least one sensor.

5. The method according to claim 1, which comprises enabling the closed-loop control to communicate with other deceleration systems, control units, and/or sensors.

6. The method according to claim 1, which comprises setting a delay between a recognition of a closed-loop control deviation, a subsequent calculation, and an approximated adaptation by the energy absorber to less than 1 s.

7. The method according to claim 6, which comprises setting the delay to less than 100 ms.

8. The method according to claim 6, which comprises setting the delay to less than 1 ms.

9. The method according to claim 1, which comprises affording a controller, configured at least partially to control a force of the energy absorber before, during, and/or after the deceleration procedure, precedence over a closed-loop controller.

10. The method according to claim 1, which comprises implementing the method steps for improving a safety, protection, or restraint system of a motor vehicle, for closed-loop controlled energy absorption in a seat suspension, for closed-loop controlled energy absorption in a mine protection system of a vehicles, or for crash safety of helicopters.

11. The method according to claim 1, which comprises driving the method for automatically compensating an influence of interfering variables selected from the group consisting of temperature, friction, or composition of the fluid, on the counterforce generated by the energy absorber.

12. The method according to claim 1, which comprises calculating the required acceleration solely from the relative velocity and a still available travel distance.

13. A device for closed-loop control of a controlled energy absorber, comprising:
    a piston-cylinder unit configured with a magnetorheological fluid being pressed through a constriction with the piston-cylinder unit, wherein a flowability of the magnetorheological fluid at the constriction is adjustable by a current flow through a coil disposed to subject the magnetorheological fluid to a magnetic field and to set a damping force;
    a sensor unit configured for repeatedly ascertaining a relative position, a velocity, or an acceleration of a movable part to a fixed part of the energy absorber during a plurality of measurements; and
    a controller connected to receive corresponding signals from said sensor unit, configured to repeatedly ascertain a relative velocity of the movable part relative to the fixed part, to repeatedly ascertain a still available travel distance during each measurement, and to calculate the current flow through the coil for setting the damping force required to stop the piston-cylinder unit at a given end position.

14. A method for closed-loop control of a current flow in an electromagnetic coil disposed to control a flowability of a magnetorheological fluid of a controllable energy absorber, the energy absorber acting as a damper between two parts that are movable relative to one another along a limited travel distance, and a damping force of which is determined by the current flow through the magnetic coil, the method which comprises:
    repeatedly ascertaining a relative velocity between a first movable part and a second fixed part continuously or at intervals,
    calculating at least once a curve of the velocity required for the braking from the measured relative velocity to standstill at an end of the travel distance;
    repeatedly calculating the current flow from the relative velocity and the velocity curve such that, during further travel of the first and second relatively movable parts, a value of the velocity is at least approximately achieved.

15. The method according to claim 14, which comprises calculating the velocity curve required for the standstill at the end of the travel distance depending on the travel distance or depending on a travel time.

16. The method according to claim 14, which comprises repeatedly ascertaining the relative velocity and ascertaining the still available travel distance during each measurement.

17. The method according to claim 14, which comprises calculating at least one or both of the relative velocity or the still available travel distance from signals of a position sensor disposed to detect a relative position of the first and second, relatively movable parts of the energy absorber.

18. The method according to claim 14, which comprises ascertaining at least one or both of the relative velocity or the still available travel distance from signals of at least two acceleration sensors, wherein at least one acceleration sensor is attached to a displaceable part of the energy absorber and at least one further acceleration sensor is attached to a part of the energy absorber resting in relation thereto or to connected elements corresponding to the first and second parts.

19. The method according to claim 14, which comprises determining at least one variable selected from the group consisting of a position, a distance, a velocity, and an acceleration required for the closed-loop control directly or indirectly via other physical variables from at least one sensor.

20. The method according to claim 14, which comprises enabling the closed-loop control to communicate with other deceleration systems, control units, and/or sensors.

21. The method according to claim 14, which comprises setting a delay between a recognition of a closed-loop control deviation, a subsequent calculation, and an approximated adaptation by the energy absorber to less than 1 s.

22. The method according to claim 21, which comprises setting the delay to less than 1 ms.

23. The method according to claim 14, which comprises affording a controller, configured at least partially to control a force of the energy absorber before, during, and/or after the deceleration procedure, precedence over the closed-loop controller.

24. The method according to claim 14, which comprises implementing the method steps for improving a safety, protection, or restraint system of a motor vehicle, for closed-loop controlled energy absorption in a seat suspension, for closed-loop controlled energy absorption in a mine protection system of a vehicle, or for controlled crash safety energy absorption of a helicopter.

25. The method according to claim 14, which comprises driving the method for automatically compensating an influence of interfering variables selected from the group consisting of temperature, friction, or composition of the fluid, on the counterforce generated by the energy absorber.

* * * * *